(12) United States Patent
Cho

(10) Patent No.: US 11,320,315 B1
(45) Date of Patent: May 3, 2022

(54) ERROR CORRECTION UNIT AND OBJECT TEMPERATURE DETECTION DEVICE

(71) Applicant: EMTAKE INC., Seoul (KR)

(72) Inventor: Yongho Cho, Hanam-si (KR)

(73) Assignee: EMTAKE INC., Seoul (KR)

( * ) Notice: Subject to any disclaimer, the term of this patent is extended or adjusted under 35 U.S.C. 154(b) by 0 days.

(21) Appl. No.: 17/154,564

(22) Filed: Jan. 21, 2021

(30) Foreign Application Priority Data

Nov. 23, 2020 (KR) .......................... 10-2020-0158117

(51) Int. Cl.
*H04N 5/33* (2006.01)
*G01J 5/10* (2006.01)
*H04N 17/00* (2006.01)
*G01J 5/00* (2022.01)
*G01J 5/80* (2022.01)

(52) U.S. Cl.
CPC ................ *G01J 5/10* (2013.01); *H04N 5/33* (2013.01); *H04N 17/002* (2013.01); *G01J 5/80* (2022.01); *G01J 2005/0077* (2013.01)

(58) Field of Classification Search
CPC .......... H04N 5/33; H04N 5/2256; H04N 7/18; H04N 3/09; H04N 5/332; H04N 5/365; H04N 5/3651; H04N 5/3655; H04N 5/2258; H04N 17/002; B60L 2200/26; B60L 53/124; B60L 53/126; B60L 53/305; B60L 53/12; B60L 53/122; B60L 55/00; B60L 2200/12
USPC ........................................................ 348/164
See application file for complete search history.

(56) References Cited

U.S. PATENT DOCUMENTS

| 2017/0075502 A1* | 3/2017 | Kurz ....................... G06F 3/011 |
| 2019/0195724 A1* | 6/2019 | Jo ............................. G01J 5/10 |
| 2020/0068110 A1* | 2/2020 | Guo .......................... G06T 7/80 |
| 2021/0076942 A1* | 3/2021 | Parrish ................. A61B 5/7405 |

FOREIGN PATENT DOCUMENTS

| KR | 10-1111167 B1 | 2/2012 |
| KR | 101111167 B1 * | 2/2012 |

\* cited by examiner

*Primary Examiner* — Masum Billah
(74) *Attorney, Agent, or Firm* — Stein IP, LLC

(57) ABSTRACT

Disclosed is an error correction unit enabling constant accurate measurement of a moving object by correcting an error attributable to a change in sensitivity of a thermal image sensor, a change in distance between a thermal image sensor and an object, or an ambient environment. Further disclosed is an object temperature detection device equipped with the same. The error correction unit includes a first arm member rotatably coupled to a thermal imaging camera unit, a heating element holder rotatably coupled to the first arm member, the heating element fixed to the heating element holder, and a temperature sensor configured to measure a temperature of the heating element. The heating element is positioned within an angle of view of the thermal imaging camera unit through rotational motion of the first arm member and the heating element holder. The temperature sensor measures the temperature of the heating element at a first time and a second time different from the first time so that the controller can use a temperature change value of the heating element. Data of the temperatures of the heating element, which are measured respectively at the first time and the second time, are transmitted to the controller.

12 Claims, 14 Drawing Sheets

ERROR CORRECTION UNIT AND OBJECT TEMPERATURE DETECTION DEVICE

CROSS REFERENCE TO RELATED APPLICATION

The present application claims priority to Korean Patent Application No. 10-2020-0158117, filed Nov. 23, 2020, the entire contents of which is incorporated herein for all purposes by this reference.

BACKGROUND OF THE INVENTION

1. Field of the Invention

The present invention relates to a thermal imaging camera and, more particularly, to an error correction unit and an object temperature detection device equipped with the same, the error correction unit and the object temperature detection device being capable of easily and accurately measuring the body temperature of a moving object by using a USB port-equipped electronic device such as a smartphone, a laptop computer, or a desktop computer.

2. Description of the Related Art

A thermal imaging camera is a device that detects infrared rays emitted from an object and expresses the measurements with various colors that depend on temperatures, thereby visualizing the body temperature of the object. These thermal imaging cameras are used in various industrial fields. For example, thermal imaging cameras are installed at immigration checkpoints and are used to detect people with a higher body temperature than the normal body temperature by sensing heat radiated from the people.

Thermal image sensors included in the thermal imaging cameras are usually manufactured in the form of a semiconductor device or a micro-electro mechanical system (MEMS). Therefore, the sensing characteristics of the thermal image sensors change over time. That is, the sensitivity of a thermal image sensor decreases with time.

In this regard, a method of visualizing temperatures using a conventional thermal imaging camera will be briefly described below. A conventional thermal imaging camera has a lookup table in which temperatures and colors are matched. Conventionally, when a thermal sensor array senses a temperature, the lookup table is referenced to determine a color corresponding to the sensed temperature, and the sensed temperature is visualized in the corresponding color. Therefore, when a person is photographed with a conventional thermal imaging camera, the photograph of the person is displayed in a relatively low temperature color when the person is photographed from a long distance but in a relatively high temperature color when the same person is photographed from a short distance. This is because thermal energy decreases with distance.

That is, a conventional thermal image sensor exhibits sensitivity that varies depending on the distance between the sensor and a subject (i.e., measurement target), an ambient environment, and a time lapse. Accordingly, even though the actual temperature of an object does not change, the displayed color of the thermal image of the object varies depending on the distance between the thermal image sensor and the object, an ambient environment, and a period of time the thermal image sensor is used.

In order to solve this problem, a thermal image sensor needs to be replaced or repaired after being used for a certain period of time, and a high-performance thermal image sensor such as a high-resolution thermal image sensor is required. In addition, a function of automatically tracking changes in temperature color depending on a distance between a subject and a thermal image sensor and an ambient environment and of correcting the temperature color is required. However, this function has a problem of significantly increasing the price and maintenance cost of the thermal imaging camera.

Documents of Related Art
Patent Document
(Patent Document 1) Korean Patent No. 10-1111167 (Jan. 25, 2012)

SUMMARY OF THE INVENTION

The present invention has been made in view of the problems occurring in the related art and an objective of the present invention is to provide an error correction unit capable compensating for a temperature measurement error attributable to a change in sensitivity of a thermal image sensor depending on a utilization time of the thermal image sensor, a distance between the thermal image sensor and an object to be measured, and an ambient environment. Another objective of the present invention is to provide an object temperature detection device equipped with the error correction unit, the object temperature detection device being capable of constantly accurately detecting the body temperature of an object such as a moving person by correcting the measurement error.

In order to achieve one objective of the present invention, one aspect of the present invention provides an error correction unit including: a first arm member connected to a thermal imaging camera unit and configured to be rotatable; a heating element holder connected to the first arm member and configured to be rotatable; the heating element fixed to the heating element holder; and a temperature sensor configured to measure a temperature of the heating element.

The heating element may be configured to be positionable within an angle θ1 of view of the thermal imaging camera unit through rotational operations of the first arm member and the heating element holder such that the thermal imaging camera unit can capture a thermal image of the heating element and a controller uses data of the thermal image of the heating element.

The temperature sensor may be configured to measure the temperature of the heating element at a first time and the temperature of the heating element at a second time different from the first time so that the controller can use a temperature change value of the heating element.

Data of the temperatures of the heating element, which are measured respectively at the first time and the second time, may be transmitted to the controller.

Another aspect of the present invention provides an object temperature detection device including: a thermal imaging camera unit equipped with a thermal image sensor; an error correction unit; and a controller that calculates a temperature of a temperature measurement target object on the basis of data of a thermal image of the temperature measurement target object, which is obtained by the thermal image sensor, data of a thermal image of a heating element of the error correction unit, which is obtained by the thermal image sensor, and a temperature change value of the heating element of the error correction unit.

The error correction unit and the object temperature detection device equipped with the same, according to the present invention, can accurately detect the body temperature of a temperature measurement target object by correcting a temperature measurement error that varies depending on the distance between a thermal image sensor and an object, an ambient environment, and a utilization time of the thermal image sensor.

In the related art, in order to remove or correct such a temperature measurement error, an expensive thermal image sensor having high performance (for example, high resolution) was required, or a thermal image sensor had to be periodically repaired or replaced. However, according to the present invention, with the error correction unit included in the object temperature detection device, it is possible to accurately correct errors caused by various reasons without requiring an expensive thermal image sensor or without periodic maintenance of such an expensive thermal image sensor.

BRIEF DESCRIPTION OF THE DRAWINGS

The above and other objectives, features, and other advantages of the present invention will be more clearly understood from the following detailed description taken in conjunction with the accompanying drawings, in which.

DESCRIPTION OF THE PREFERRED EMBODIMENTS

The terminology used herein is for the purpose of describing particular embodiments only and is not intended to limit the scope of the present invention. As used herein, the singular forms "a", "an", and "the" are intended to include the plural forms as well unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof.

In addition, the term "on" or "above" means on or above an object, and does not necessarily mean an upper position based on the direction of gravity. That is, the term "on" or "above" referred to in the present specification includes not only a case that an element is located on or under another element but also a case that one element is located in front or rear of another element.

Also, when a portion of a region, plate, or the like is referred to as being "on another portion or on top of another portion," it may be directly on, be in contact with, spaced from the other portion, or another portion may be interposed between them.

It is also to be understood that when one element is referred to herein as being "connected to" or "coupled to" another element, it may be connected or coupled directly to the other element, or connected or coupled to the other element via a mediating element interposed therebetween, unless specifically stated otherwise.

In addition, terms used in the specification, "first", "second", etc., may be used to describe various components, but the components are not to be construed as being limited to the terms. These terms are used only for the purpose of distinguishing a component from another component.

Herein below, preferred embodiments, advantages, and features of the present invention will be described in detail with reference to the accompanying drawings.

Figure 1:
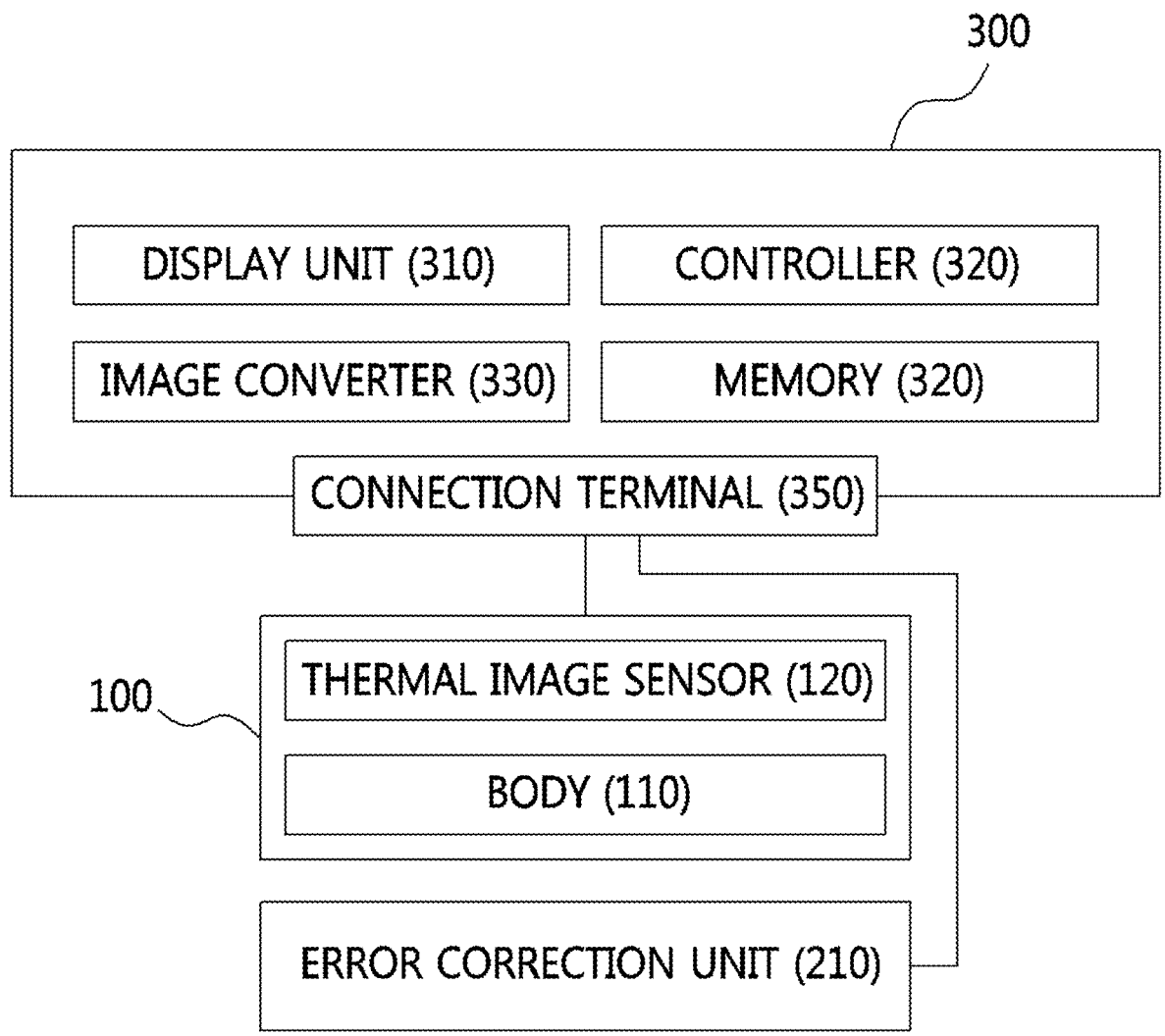
FIG. 1 is a block diagram illustrating the overall construction of an object temperature detection device according to one embodiment of the present invention.

FIG. 1 is a block diagram illustrating the overall construction of an object temperature detection device according to one embodiment of the present invention. Referring to FIG. 1, an object temperature detection device according to one embodiment of the present invention includes a thermal imaging camera unit 100, a control unit 300, and an error correction unit 200.

The thermal imaging camera unit 100 is a device for obtaining a thermal image of an object. The thermal imaging camera unit 100 includes a thermal image sensor 120 and a body 110.

When a thermal energy wave reaches the thermal image sensor 120 to which a predetermined current is applied, the resistance changes in the thermal image sensor 120, the change in the resistance is measured as a voltage value, this voltage value is converted into a digital signal by an ND converter, and the digital signal is output from the thermal image sensor 120.

The body 110 is a casing for protecting the thermal image sensor 120 from an external impact by partially or entirely accommodating the thermal image sensor 120. The error correction unit 200 is mounted in a region of the body 110.

The control unit 300 includes a display unit 310, an image converter 330, a controller 320, a memory 340, and a connection terminal 350. The control unit 300 is an electronic device such as a desktop computer, a laptop computer, a tablet PC, a smartphone, or a smartpad The image converter 330 is a module that converts a processed result output from the controller 320 into an image and outputs the image to the display unit 310.

The controller 320 is a processing device that performs computations and control for calculating the temperature of an object.

The connection terminal 350 is a port such as a USB port for connecting an external device such as the thermal imaging camera unit 100 or the error correction unit 200 to the control unit 300.

Although FIG. 1 illustrates an example in which the controller 320 that calculates the temperature of an object is mounted on an electronic device, it is possible that the controller 320 is mounted on the thermal imaging camera unit 100 or the error correction unit 200.

The thermal image sensor 20 is a semiconductor device or a micro-electro mechanical system (MEMS). Therefore, the sensing characteristics of the thermal image sensor changes over time. That is, the sensitivity of the thermal image sensor 120 decreases with time.

In this regard, a method of visualizing temperatures using a conventional thermal imaging camera will be briefly described below. A conventional thermal imaging camera has a lookup table in which temperatures and colors are matched. Conventionally, after a thermal sensor array senses a temperature, the lookup table is referenced to determine a color corresponding to the detected temperature, and the sensed temperature is visualized in the form of the corresponding color. Therefore, when a person is photographed with a conventional thermal imaging camera, the photograph of the person is displayed in a relatively low temperature color when the person is photographed from a long distance but in a relatively high temperature color when the same person is photographed from a short distance. Thermal energy decreases with distance.

That is, a conventional thermal image sensor exhibits sensitivity that varies depending on the distance between the sensor and a subject (i.e., measurement target), environmental conditions, and lapse of time. Accordingly, even when the body temperature of a measurement target object does not change, the displayed color of the thermal image of the object varies depending on the distance between the thermal image sensor and the object, the surrounding environment, and the utilization time of the thermal image sensor.

In order to solve this problem, a thermal image sensor needs to be replaced or repaired after being used for a certain period of time, and a high-performance thermal image sensor such as a high-resolution thermal image sensor is required. In addition, a function of automatically tracking changes in temperature color depending to a distance between a subject and a thermal image sensor and an ambient environment and a function of correcting the temperature color are required. However, these functions have a problem of significantly increasing the price and maintenance cost of the thermal imaging camera.

However, the error correction unit and the object temperature detection device according to the present invention can accurately measure the body temperature of an object by correcting an error that occurs depending on a distance between a thermal image sensor and an object, an ambient environment, and a service time of the thermal image sensor without an increase in cost.

This is achieved by the error correction function of the object temperature detection device according to the present invention. For the error correction, first and second thermal images of a heating element 10 and a temperature change value of the heating element 10 are used.

The error correction unit according to the present invention is a device that provides information on the first and second thermal images and a temperature change value of the heating element 10 for error correction.

Figure 2:
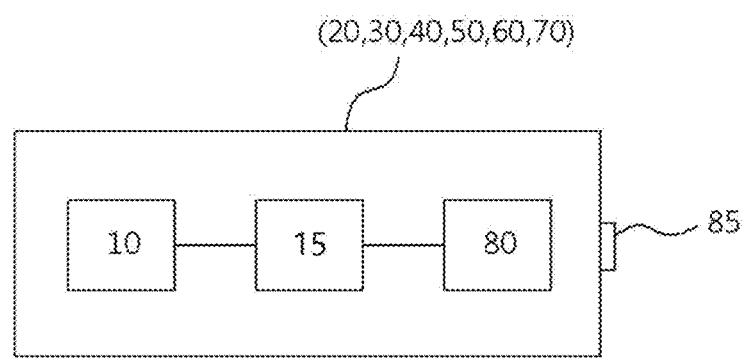
FIG. 2 is a block diagram illustrating an error correction unit according to one embodiment of the present invention.
Figure 3:
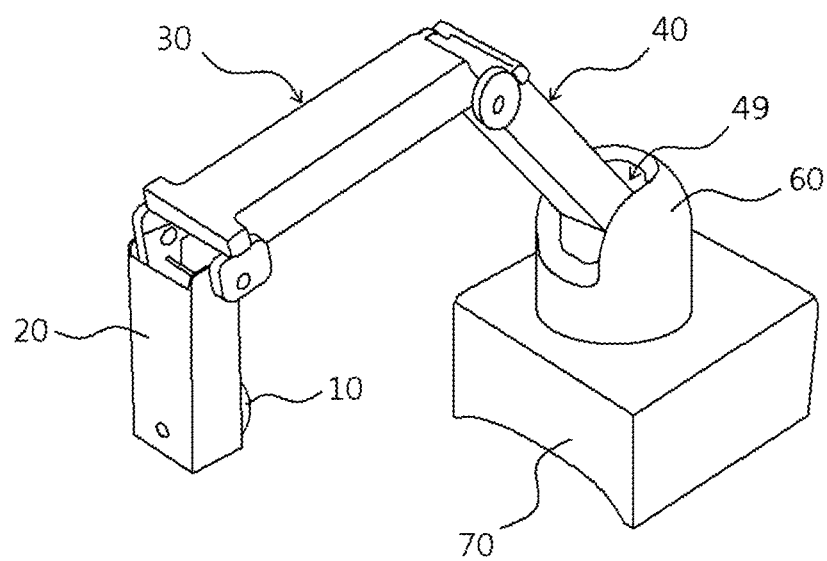
FIG. 3 is a perspective view of an error correction unit according to one embodiment of the present invention.
Figure 4:
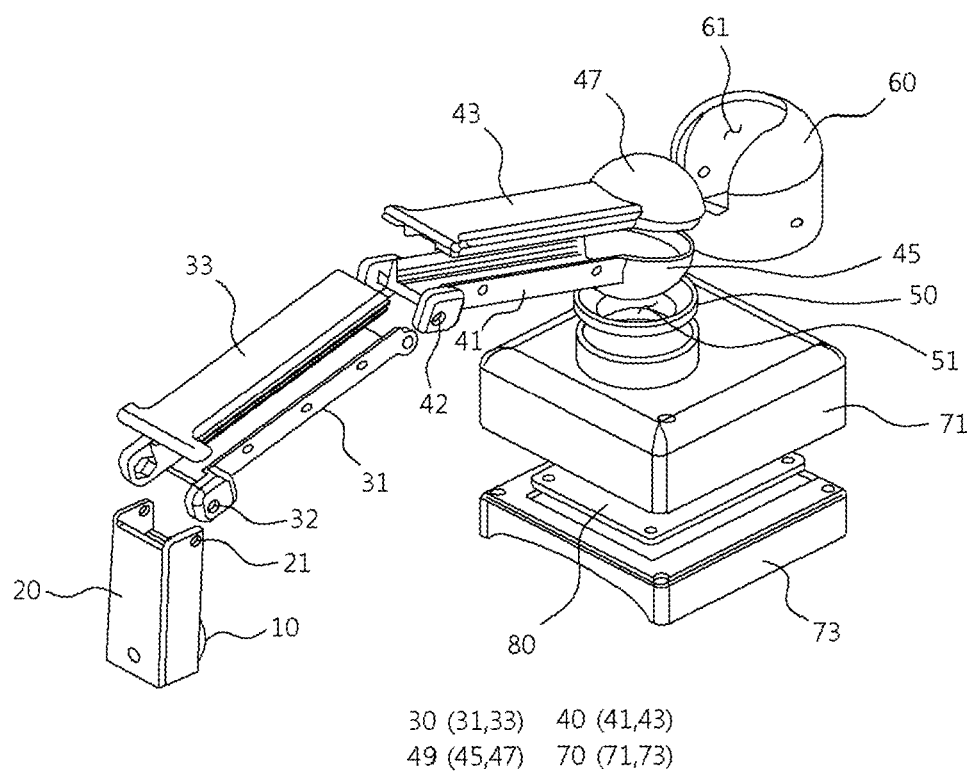
FIG. 4 is an exploded perspective view of the error correction unit of FIG. 3.
Figure 5:
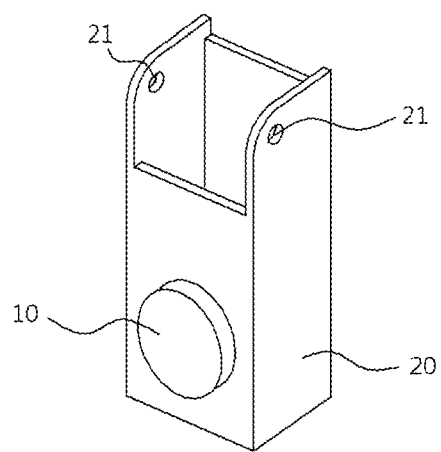
FIG. 5 is a view illustrating a heating element holder holding a heating element in one embodiment of the present invention.
Figure 6:
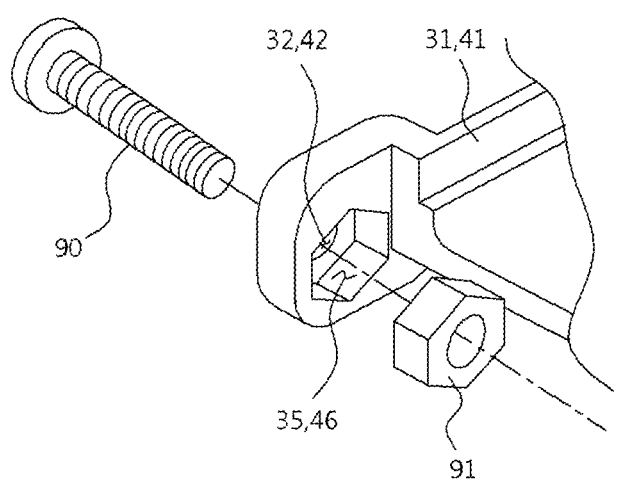
FIG. 6 is a view illustrating a hinge joint structure jointing a first arm member and a second arm member in a hinged manner.
Figure 7:
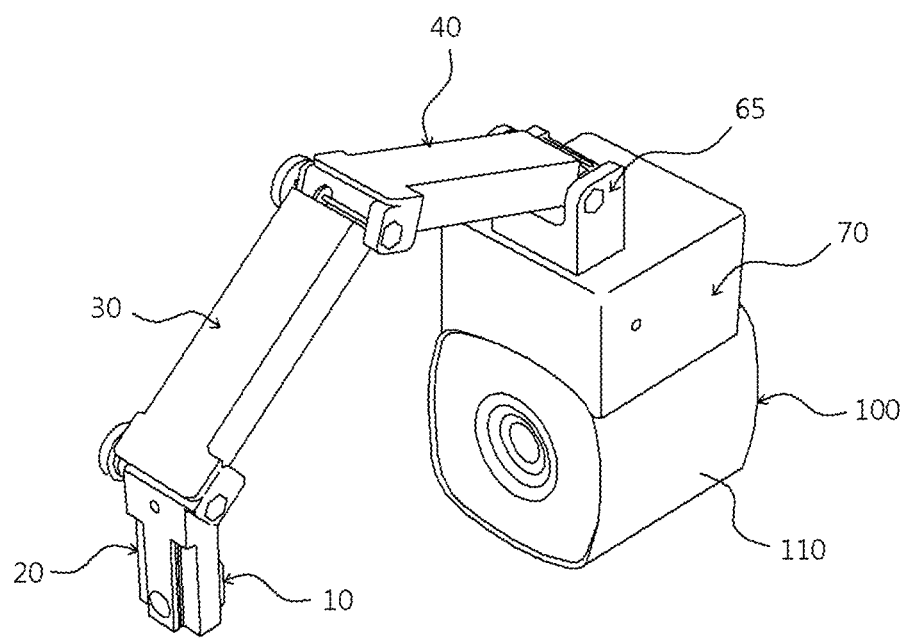
FIG. 7 is a perspective view illustrating a state in which an error correction unit according to one embodiment of the present invention is mounted on a thermal imaging camera unit.

FIG. 2 is a block diagram illustrating the construction of an error correction unit according to the present invention, FIG. 3 is a perspective view of an error correction unit according to one embodiment of the present invention, FIG. 4 is an exploded perspective view of the error correction unit of FIG. 3, FIG. 5 is a view illustrating a heating element holder holding a heating element used in one embodiment of the present invention, FIG. 6 is a view illustrating a hinge joint structure jointing a first arm member and a second arm member in a hinged manner, according to one embodiment of the present invention, and FIG. 7 is a perspective view illustrating a thermal imaging camera equipped with an error correction unit according to one embodiment of the present invention.

Referring to FIGS. 2 to 7, an error correction unit 200 according to one embodiment of the present invention includes a support 70, a first arm member 40, a heating element holder 20, a heating element 10, and a temperature sensor 15. Preferably, the error correction unit 200 further includes a second arm member 30. More preferably, the error correction unit 200 further includes a heating controller 80.

The support 70 is a mechanism for supporting the first arm member 40 and is configured to be coupled to the thermal imaging camera unit 100.

According to one embodiment, the support 70 is composed of an upper casing 71 and a lower casing 73. The upper casing 71 is configured to be coupled to the first arm member 40, and the lower casing 73 is configured to be mounted on the body 110 of the thermal imaging camera unit 100.

When the upper casing 71 and the lower casing 73 are combined to form the support 71, an accommodation space is defined in the support 71. The heating controller 80 is installed in the accommodation space of the support 70.

The first arm member 40 is a rod-shaped or pipe-shaped member for supporting the heating element holder 20. One end of the first arm member 30 is connected to the support 70.

The first arm member 40 is rotatably connected to the support 70 to adjust the positions of the heating element holder 20 and the heating element 10 so that the heating element 10 can be positioned in a correct position. Here, the correct position of the heating element 10 specifically means a position of a pixel array of a thermal imaging sensor. This will be described in more detail below.

According to one embodiment, the first arm member 40 is coupled to the support 70 via a ball joint. In this case, one end of the first arm member 40 is provided with a rotor 49 having a curved shape such as a spherical shape or a cylinder shape.

In the case of the embodiment of FIGS. 3 and 4, the first arm member 40 is composed of an upper member 43 and a lower member 41. In this case, one end of the upper member 43 is provided with a hemispherical upper rotor 47 and one end of the lower member 41 is provided with a hemispherical lower rotor 45.

When the upper member 43 and the lower member 41 are combined to form the first arm member 40, and the upper rotor 47 and the lower rotor 45 are also mutually combined to form the spherical rotor 49.

In addition, a joint socket is installed on the support 70 to enable rotation of the rotor 49. The joint socket includes a socket body 60 in which a rotor accommodation space 61 is defined and a socket support 50 for supporting the rotor 49.

The socket support 50 has a seating cavity 51 in which the rotor 49 is rotatably seated. The seating cavity 51 is a recessed region in which at least a lower portion of the lower rotor 45 is received.

The socket body 60 is a member that surrounds at least the upper rotor 47 of the rotor 49. Accordingly, an accommodation space 61 having a shape conforming to the upper rotor 47 is formed in the socket body 60.

When the rotor 49 is received in the accommodation space 61 of the socket body 60, at least a part of the outer curved surface of the rotor 49 is in contact with at least a part of the inner curved surface of the socket body 60.

According to the embodiment illustrated in FIGS. 3 and 4, in a state in which the lower rotor 45 is seated in the seating cavity 51, the upper rotor 47 is received in the accommodation space 61 of the socket body 60, thereby being confined in the socket body 60. Accordingly, the rotor 49 can rotate and turn without escaping from the joint socket, thereby enabling the rotational operation of the first arm member 40.

The rotor 49 is configured to be locked after rotating a predetermined angle due to a frictional force between the inner surface of the joint socket and the outer surface of the rotor 49.

In another embodiment, the first arm member 40 is coupled to the support 70 via a hinge-type joint. In this case, one end of the first arm member 40 is coupled to the support 70 via a hinge pin and is thus rotatable around the hinge pin.

The second arm member 30 is a rod-shaped or pipe-shaped member disposed between the first arm member 30 and the heating element holder 20.

In the case of the embodiment illustrated in FIGS. 3 and 4, the second arm member 30 is composed of an upper member 33 and a lower member 31. In this case, the upper member 33 and the lower member 31 are combined to form the second arm member 30.

One end of the second arm member 30 is rotatably connected to the first arm member 40, and the other end is rotatably connected to the heating element holder 20. Thus, the heating element 10 can be positioned at a correct position.

In one embodiment, the second arm member 30 is coupled to the first arm member 40 via a hinge-type joint. In this case, one end of the second arm member 30 is coupled to the first arm member 40 via a hinge pin and is thus rotatable around the hinge pin. In this case, a through hole 42 into which the hinge pin 90 is to be inserted is formed at a first portion of the first joint member 40 so that the first portion of the first joint member 40 can be joined with the second joint member 30 in a hinged manner. In addition, the first arm member 40 has a nut recess 35 at the first portion such that a nut 91 can be received and fixed in the first portion which is to be hinge-joined with the second arm member. The nut recess 46 is configured to communicate with the through hole 42, and a fastening hole of the nut 91 received in the nut recess 35 is configured to communicate with the through hole 42.

The hinge pin 90 passes through the through hole 42 and is screwed into the fastening hole of the nut 91 that is received in the nut recess 35, so that the first arm member 40 and the second arm member 30 are joined in a hinged manner (see FIG. 6).

The heating element holder 20 is a member for supporting the heating element 10 and is rotatably connected to the first arm member 40. In the embodiment illustrated in FIGS. 3 and 4, the heating element holder 20 is indirectly connected to the first arm member 40 via the second arm member 30.

In one embodiment, the heating element holder 20 is coupled to the second arm member 30 via a hinge-type joint. In this case, one end of the heating element holder 20 is coupled to the second arm member 30 via a hinge pin 90 and is thus rotatable around the hinge pin 90.

In this case, as illustrated in FIG. 6, an end of the second arm member 30 is provided with a through hole 32 into which a hinge pin 90 is to be inserted and is provided with a nut recess 35 in which a nut 35 is to be received. The nut recess 35 is configured to communicate with the through hole 32, and a fastening hole of the nut 91 received in the nut recess 35 is configured to communicate with the through hole 32.

The hinge pin 90 is inserted to pass through the through hole 35 of the second arm member 30 and the through hole 21 of the heating element holder 21 and is screwed into the fastening hole of the nut 91 received in the nut recess 35. In this way, the heating element holder 20 and the second arm member 30 are joined with each other in a hinged manner (see FIG. 6).

The heating element 10 is a component for providing information for error correction when the temperature of an object is calculated. Here, the term "information for error correction" includes first and second thermal images and temperature change values of the heating element 10.

The heating element 10 is a device capable of generating heat by itself. According to one embodiment, the heating element 10 includes a positive temperature coefficient (PTC) device.

The PTC device is a semiconductor device configured such that the electrical resistance therein rapidly increases when the temperature thereof exceeds the Curie temperature. The PTC device has a self-temperature control function that maintains a predetermined temperature regardless of the ambient temperature when a voltage is applied thereto.

The heating element 10 may be a ceramic heating element 10 based on a PTC device. In this case, the PTC ceramic heating element 10 includes an alumina substrate, a resistor, and a lead-bonded connection terminal.

In another embodiment, the heating element 10 includes a light emitting diode (LED) device.

The heating element 10 is fixed to the heating element holder 20. In the case of the embodiment illustrated in FIGS. 3 and 4, the heating element 10 is fixed to one side of the heating element holder 20.

When the error correction unit 200 is mounted on the thermal imaging camera unit 100, the position of the heating element 10 needs to be adjusted so that the heating element 10 is positioned at a correct position.

The adjustment of the heating element 10 to be positioned at the correct position is performed through the rotational motion of the first arm member 40, the second arm member 30, and the heating element holder 20.

Figure 8:
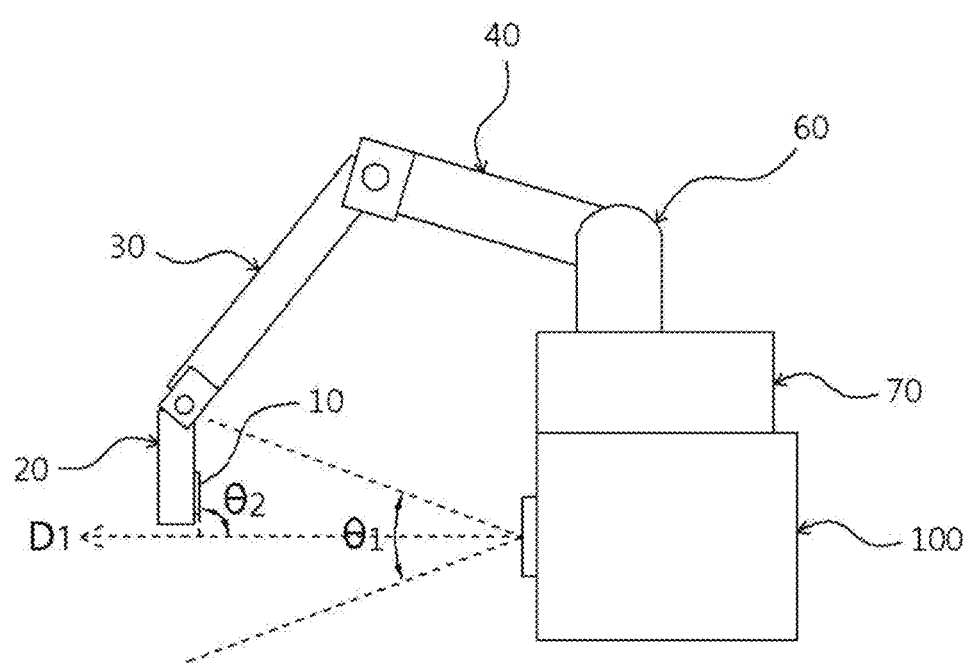
FIG. 8 is a side view showing a state in which an error correction unit according to one embodiment of the present invention is mounted on a thermal imaging camera unit, thereby illustrating arrangement conditions of a heating element.

FIG. 8 is a side view illustrating a state in which an error correction unit according to the present invention is mounted on a thermal imaging camera unit. That is, the arrangement of the heating element is illustrated. The position adjustment of the heating element 10 will be described with reference to FIG. 8.

When the error correction unit 200 is mounted on the thermal imaging camera unit 100, the heating element 10 is disposed in front of the thermal imaging camera unit 100 and is positioned a distance from the thermal imaging sensor 120.

In order to perform error correction using the heating element 10, it is required that the heating element 10 be arranged at a correct position satisfying a first condition described below. For more accurate error correction, the heating element 10 must be placed at a correct position satisfying a second condition described below.

(1) First Condition for Correct Position of Heating Element

The controller 320 uses data of first and second thermal images of the heating element 10 when calculating the body temperature of an object, and the first and second thermal images of the heating element 10 are captured by a thermal imaging camera (i.e., thermal image sensor 120).

Therefore, the heating element 10 needs to be positioned such that the thermal image sensor 120 can capture a thermal image of the heating element 10. Specifically, the heating element 10 needs to be positioned within an angle θ1 of view of the thermal imaging camera unit 100.

Preferably, the heating element 10 is configured to be disposed in an upper region within the angle θ1 of view. Here, the term "upper region within an angle of view" refers to a region above a thermal imaging central axis D of the thermal imaging camera unit 100.

In addition, the first condition can be satisfied through the rotational motion of the first arm member 40 and the second arm member 30.

(2) Second Condition for Correct Position of Heating Element

When calculating the temperature of an object, the controller 320 uses a temperature change value of the heating element 10 as well as the first and second thermal images of the heating element 10. The temperature change value of the heating element 10 is obtained by a temperature sensor 15.

For a more accurate error correction based on the data of the first and second thermal images and the temperature change value, the heating element 10 needs to be arranged perpendicularly to the thermal imaging central axis D1 of the thermal imaging camera unit 100.

In other words, when the thermal image sensor 120 captures a thermal image of the heating element 10, the heating element 10 needs to be disposed perpendicularly to the thermal imaging central axis D1.

Here, the term "thermal imaging central axis D1" refers to the axial direction of the camera. Specifically, it refers to a direction of an angle of θ1*½, which divides the angle θ1 of view into two halves.

In addition, in the state in which the heating element is perpendicular to the thermal imaging central axis D1, a reference plane may be a subject surface of the heating element 10.

That is, it is preferable that the heating element 10 is disposed such that an imaginary line extending from the subject surface is orthogonal (i.e., at the right angle θ2) to the thermal imaging central axis D1. Here, the subject surface of the heating element 10 is a heating surface of which a thermal image is obtained by the thermal image sensor 120 and is a surface facing the thermal imaging camera unit 100.

In addition, the second condition can be satisfied through the rotational motion of the first arm member 40, the second arm member 30, and the heating element holder 20.

The temperature sensor 15 is a device that measures the temperature of the heating element 10 and is implemented with a digital temperature sensor.

The temperature sensor 15 is configured to measure a temperature (hereinafter, referred to as a first temperature) of the heating element 10 at a first time and a temperature (hereinafter, referred to as a second temperature) of the heating element 10 so that the controller 320 can perform error correction using the temperature change value of the heating element 10.

In addition, data of the first temperature of the heating element 10, which is measured by the temperature sensor 15 at the first time, and data of the second temperature of the heating element 10, which is measured by the temperature sensor 15 at the second time, are transmitted to the controller 320 of the control unit 300. In this case, the data of the first temperature of the heating element 10 and the data of the second temperature of the heating element 10 are transmitted to the control unit 300 via a controller (for example, an MCU or the like) built in the error correction unit 200.

The object temperature detection device of the present invention obtains a thermal image of the heating element 10 at least twice in order to correct a measurement error occurring at the time of detecting the temperature of an object. That is, the error correction unit 200 measures the temperature of the heating element 10 twice at different times. The temperature measurements are performed at the time of obtaining the thermal images of the heating element 10.

The first time is a time at which a first thermal image of the heating element 10 is captured. The capturing the first thermal image of the heating element 10 is performed prior to capturing a thermal image of a target object.

The second time is a time at which a second thermal image of the heating element 10 is obtained after a predetermined time has elapsed from the first time. The second time is also a time at which a thermal image of the target object is measured.

The heating controller 80 is a processor that controls a voltage applied to the heating element 10 such that the heating element 10 constantly generates heat. For example, the heating controller is implemented with a micro controller unit (MCU). The heating controller 80 is configured to process temperatures of the heating element 10, which are measured by the temperature sensor 15, and to transmit data resulting from the processing operation to the control unit 300.

The error correction unit 300 further includes a connection terminal 85. The connection terminal 85 includes a connection port into which a power cable or a communication cable can be plugged. Preferably, the connection terminal 85 includes a USB port.

According to one embodiment, the error correction unit 200 is connected to the control unit 300 through a cable connected to the connection terminal 85, thereby receiving power from the power supply of the control unit 300 and transmitting temperature data of the heating element 10 to the control unit 300.

According to another embodiment, the error correction unit 200 is electrically connected to a separate power supply unit (for example, home/industrial power supply) through a power cable and is connected to the control unit 300 through a communication cable or a wireless communication module.

According to another embodiment, the temperature data of the heating element 10, which is measured by the error correction unit 200, is transmitted to the control unit 300 via the thermal imaging camera unit 100. In this case, the error correction unit 200 is configured to communicate with the thermal imaging camera unit 100 according to a predetermined communication scheme, and the thermal imaging camera unit 100 is configured to communicate with the control unit 300 according to a predetermined communication scheme.

The thermal image data measured by the thermal imaging camera unit 100 is directly transmitted to the control unit 300. Alternatively, the thermal image data is transmitted to the control unit 300 via the error correction unit 200.

Hereinafter, an object temperature detection method will be described below. The method calculates the temperature of the target object while correcting a temperature measurement error on the basis of the thermal image data of the target object and the heating element 10, which are measured by the thermal imaging camera, and the temperature change value of the heating element 10, which is transmitted from the error correction unit 200. Specifically, a method of detecting the body temperature of a moving person (target object) will be described as an example of the object temperature detection method.

Figure 9:
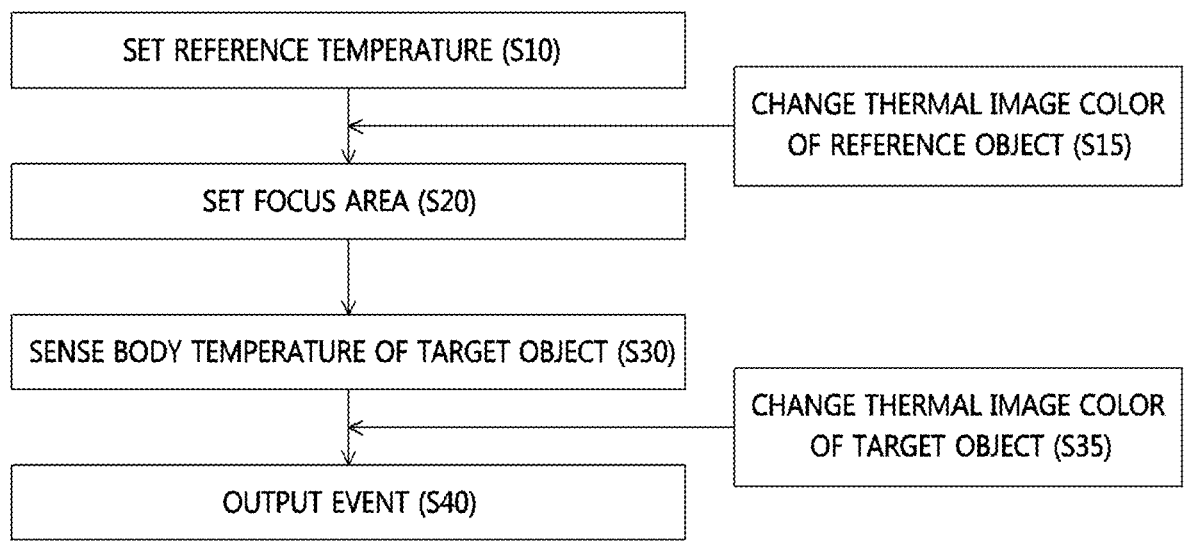
FIG. 9 is a flowchart illustrating a method of detecting a body temperature of a moving object with a thermal image sensor according to one embodiment of the present invention.
Figure 10:
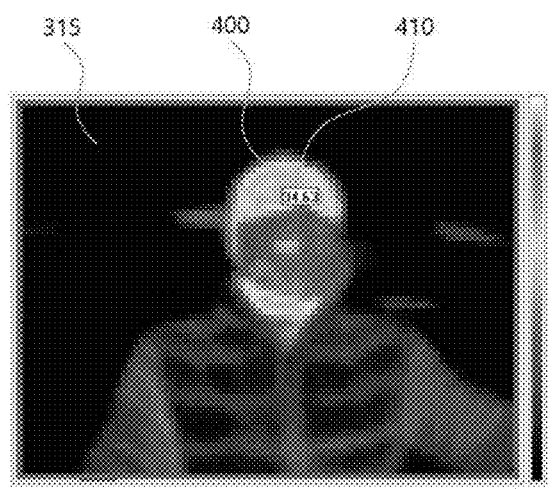
FIG. 10 is a view illustrating a reference temperature setting step.
Figure 11:
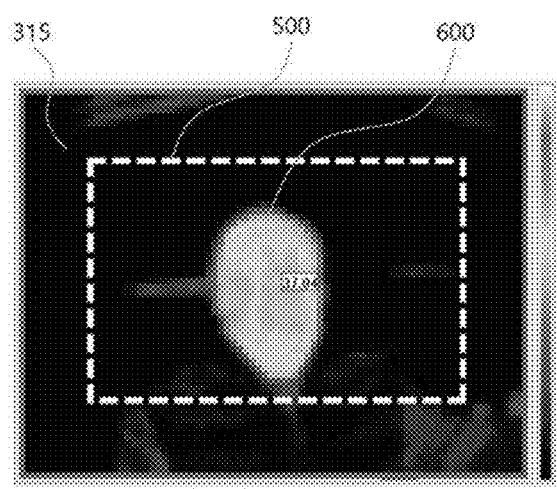
FIG. 11 is a view illustrating a step of setting a focus area and a step of detecting a body temperature of a target object.

FIG. 9 is a flowchart illustrating a method of detecting the temperature of an object, according to the present invention. FIG. 10 is a view illustrating a reference temperature setting step according to one embodiment of the present invention. FIG. 11 is a view illustrating a focus area setting step and a body temperature detection step for a target object.

Referring to FIG. 9, the object temperature detection method according to the present invention includes a reference temperature setting step S10, a focus area setting step S20, and a body temperature detection step S30 for a target object. Preferably, the object temperature detection method further includes a thermal image color change step S15 and S35, and an event output step S40.

(1) Reference Temperature Setting Step S10

In the reference temperature setting step S10, a highest temperature spot 410 that is a region exhibiting the highest temperature among spots in a thermal image of a reference object 400 is used to set a reference temperature that falls within a normal body temperature range.

Referring to FIG. 10, the reference setting step S10 is a step of setting the reference temperature using the temperature of the reference object 40 to calibrate a thermal image sensor before measuring the body temperatures of many moving objects. The reference object 400 may be a person with a normal body temperature.

When a thermal image of a subject with a normal body temperature (i.e., reference object 400) is captured, as illustrated in FIG. 10, a thermal image composed of pixels of various colors is displayed on a display screen of the display unit 310 of the control unit 300. However, the colors in the thermal image change depending on a distance to the object and the thermal image sensor and an ambient environment.

In the example of FIG. 10, the normal body temperature is displayed in orange. However, in the thermal image of the reference object 40 with the normal body temperature, there is a deep yellow spot. The deep yellow spot is a region representing the highest temperature.

The highest temperature spot 410 representing the highest temperature within the thermal image of the reference object 400 is corrected to exhibit a desired temperature (i.e., normal body temperature). That is, in the example of FIG. 10, the highest temperature spot 410 within the captured thermal image is a region displayed in dark yellow. When it is assumed that the color temperature of this spot corresponds to 29.5° C., 34.63° C. which is the temperature of the highest temperature spot 410 is corrected to 36.5° C. Here, the corrected temperature "36.5° C." of the highest temperature spot 410 is the reference temperature that is set in step S10.

After the reference temperature setting step S10 is completed, a correction value (i.e., offset value) of 1.87° C. (36.5° C.−34.63° C.=1.87° C.) is applied to the measured body temperature of each person.

The step sequence of the reference temperature setting step S10 and the focus area setting step S20 is not particularly limited. That is, the reference temperature setting step S10 and the focus area setting step S20 are performed in this order or in reverse order.

When the focus area setting step S20 is performed prior to the reference temperature setting step S10, the focus area setting step S20 is performed such that the entire face of a target person is included within a focused area.

(2) Focus Area Setting Step S20

FIG. 11 is a view illustrating the focus area setting step and the body temperature detection step for a target object. In the focus area setting step S20, an effective field is defined on the display screen 315 of the display unit 310.

For example, it is assumed that the vertical size and the horizontal size of the display screen 315 of the display unit illustrated in FIG. 11 are X1 and Y1, respectively. Referring to FIG. 11, a focus area 500 is a box-shaped field having a size of X2*Y2 smaller than the size "X1*Y1" of the full screen 315 of the display unit.

That is, the focus area 500 is a partial area selected from the entire area of the display screen 315, and this focus area 500 is used to determine an effective moving object as a temperature measurement target among a plurality of moving objects to be measured by the thermal image sensor 120.

FIG. 11 illustrates a case in which one focus area 500 is set. However, the number of focus areas is not limited to one.

For example, two focus areas can be set. In this case, the two focus areas are referred to as a first focus area and a second focus area, respectively.

Next, in the reference temperature setting step S10, multiple reference temperatures including a first reference temperature and a second reference temperature are set by measuring the temperature of each of first and second reference objects that are at different distances from the thermal image sensor 120. Specifically, the first reference object is positioned a first distance from the thermal temperature sensor 120 and the second reference object is positioned a second distance from the thermal temperature sensor 120, in which the first distance is different from the second distance.

In the reference temperature setting step S50, the first reference temperature is determined on the basis of the temperature of the first reference object whose entire face is present within the first focus area, and the second reference temperature is determined on the basis of the temperature of the second reference object whose entire face is present within the second focus area.

(3) Body Temperature Detection Step S30 for Target Object

The body temperature detection step S30 for a target object is a step of measuring the body temperature of a target object whose entire face is present within the focus area 500 among many objects (i.e., people) included in an image displayed on the display screen 315 of the display unit.

Referring to FIG. 11, when a plurality of moving objects with their face facing the thermal imaging camera unit is photographed by the thermal imaging camera unit 100, an image of the moving objects moving toward the thermal imaging camera unit 100 is displayed on the display screen 315 of the display unit 310. The multiple moving objects approach the thermal imaging camera unit 100 and finally enter the focus area 500 that is set in step S20. In this case, when there is a moving object with the face that is present within the focus area 500, the body temperature of the moving object is detected.

(4) Thermal Image Color Change Step S15 and S35

The thermal image color change step S15 for a reference object includes step S15 in which the color of the thermal image of the reference object 400 is changed and step S35 in which the color of the thermal image of the target object 600 is changed.

The thermal image color change step S15 for a reference object further includes a step of changing the current thermal image color (i.e., measured thermal image color which will be referred to as "first color") of the highest temperature spot S410 detected in the reference temperature setting step S10 into a thermal image color (hereinafter, referred to as "second color") matched with the normal body temperature.

The thermal image color matched with the normal body temperature means a temperature color used by a normal thermal imaging camera to express a normal body temperature. The second color is a color typically used to express a normal body temperature of 36.5° C. For example, the second color may be orange.

The thermal image color change step S15 for a reference object further includes a step of changing thermal image colors of respective spots in the thermal image of the reference object 400, obtained in step S10, by applying a color conversion value (i.e., offset value) that is used to change the first color into the second color.

For example, assuming that a temperature color corresponding to Level 6 is changed to a temperature color corresponding to Level 8, the color conversion value corresponds to a two-level difference. Therefore, the current thermal image colors (i.e., measured thermal image colors) of the remaining spots other than the highest temperature spot of the reference object 400 are changed to two-level higher colors, respectively.

The thermal image color change step S35 for a target object is performed in the same manner as step S15. That is, in step S35, the color change value used to change the first color into the second color in step S15 is used to change the thermal image colors of the respective spots in the image of the target object 600 measured in step S30.

(5) Event Output Step S40

The event output step S40 includes a step of setting a temperature (hereinafter, referred to as a "warning temperature") higher than the reference temperature set in step S10.

When an event in which the body temperature of the target object 600 sensed in step S30 is equal to or higher than the warning temperature occurs, a step of notifying of the event is performed.

For example, in the process of measuring the body temperature of a moving object, a warning signal in the form of a red color is displayed or an alarm sound is generated as soon as a temperature equal to or higher than the warning temperature is detected. In this case, the corresponding image is stored.

The method of detecting the body temperature of a moving object using the thermal image sensor 120, according to the present invention, may further include an error correction step.

The reference temperature set in step S10 is a temperature value corresponding to the highest temperature spot 410 in the thermal image of the reference object 400. That is, when the temperature of the pixels corresponding to the highest temperature spot 410 in the thermal image of the reference object 400 is set to a temperature value (i.e., 36.5° C.) within a normal body temperature range in step S10, the temperatures of the remaining pixels in the thermal image measured by the thermal sensor 120 are adjusted on the basis of the temperature value that is set.

The sensitivity of the thermal image sensor 120 varies depending on the environmental conditions and changes with time. For this reason, even with the same reference object 400, the characteristics of the reference temperature may vary depending on the surrounding environment and the lapse of time.

Therefore, in order to more accurately measure the body temperature of an object, the reference temperature set in step S10 needs to be corrected by reflecting a sensitivity change according to the surrounding environment and the lapse of time.

The error correction step of the present invention is a step of measuring the actual body temperature of a target object by correcting an error in measured temperature attributable to the surrounding environment and the lapse of time with respect to the reference temperature obtained in step S10 or of correcting an error in measured temperature attributable to changes in sensitivity of the thermal image sensor 120. There are two error correction methods suggested in the present invention.

[1] First Method

Figure 12:
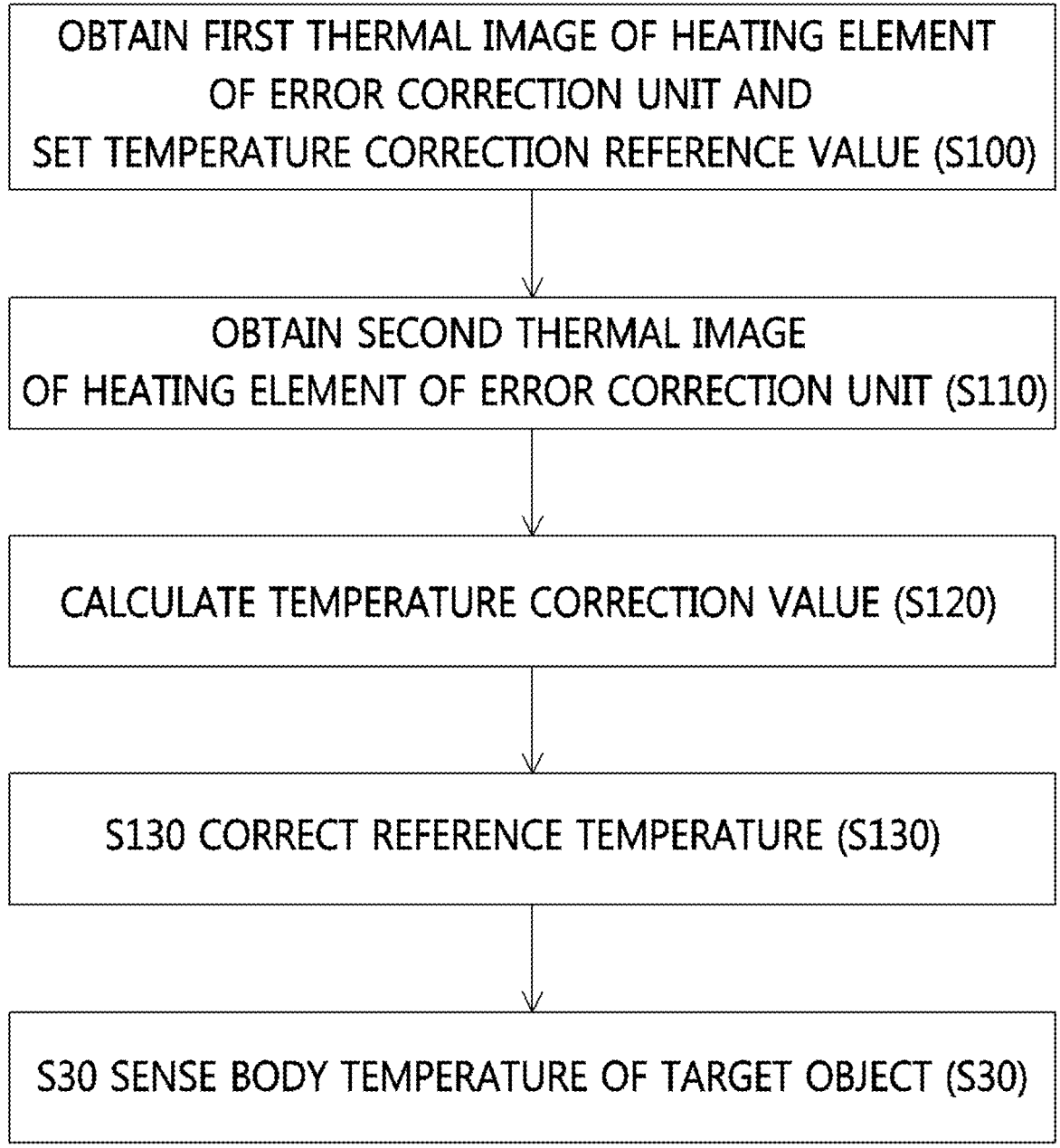
FIG. 12 is a flowchart illustrating a first exemplary error correction method according to one embodiment of the present invention.

FIG. 12 is a flowchart illustrating a first exemplary error correction method used in the present. Referring to FIG. 12, the first exemplary error correction method is a method of correcting the reference temperature set in step S10. The first error correction method includes step S100 of obtaining a first thermal image of the error correction unit 200, step S110 of obtaining a second thermal image of the error correction unit 200, a temperature correction value calculation step S120, and a reference temperature correction step S130.

The first thermal image capturing step S100 is a step of capturing a thermal image of the heating element 10 of the error correction unit 200 of the error correction unit 200 spaced a predetermined distance from the thermal image sensor and setting a reference value for temperature correction. Hereinafter, the thermal image of the error correction unit 200, which is obtained in step S100, will be referred to as a first thermal image.

Thermal image capturing in the first-thermal image capturing step S100 is performed when the thermal image of the reference object 400 is captured (i.e., reference temperature setting step S10), or is performed immediately before or after the thermal image of the reference object 400 is captured (i.e., before or after the reference temperature setting step S10).

After the thermal image of the heating element 10 of the error correction unit 200 is captured as described above, the temperature value of the captured thermal image (i.e., first thermal image) is set as a temperature correction reference value.

Step S200 of capturing the second thermal image of the error correction unit 200 is a step of recapturing a thermal image of the heating element 10 of the error correction unit 200 after a predetermined period of time elapses from the completion of step S100 in which the temperature correction reference value is set. Hereinafter, the thermal image of the heating element 10 of the error correction unit 200, which is captured again in step S110 in the same manner as step S100, is referred to as a second thermal image.

The second-thermal image capturing step S110 is periodically performed at a predetermined time interval (for example, a time interval of 20 minutes). In this case, the second thermal image of the heating element 10 is captured at regular time intervals, and each of the second thermal images is compared with the first thermal image captured in step S100 to periodically correct the reference temperature.

In this way, it is possible to constantly accurately measure the body temperature of a moving object without errors attributable to changes in environment or time lapse.

According to another embodiment, step S200 of capturing the second thermal image of the error correction unit 200 is performed when detecting the temperature of a target object (i.e., step S30). In this case, step S110 is performed such that after the temperature correction reference value setting step S100 is performed, when a thermal image of the target object 600 is captured in step S30, the thermal image (second thermal image) of the heating element 10 of the error correction unit 200 is captured at the same time.

The temperature correction value calculation step S120 is a step of calculating a temperature correction value C1 used to correct the reference temperature on the basis of the first thermal image captured in step S100 and the second thermal image captured in step S110.

This temperature correction value C1 is calculated according to Equation 1.

$$T1 - T2 = C1 \qquad \text{[Equation 1]}$$

where, T1 is a temperature correction reference value (i.e., a temperature value of the first thermal image of the heating element 10 of the error correction unit, which is measured in step S100), T2 is a temperature value of the second thermal image of the heating element 10 of the error correction unit, which is measured in step S110, and C1 is a temperature correction value.

The reference temperature correction step S130 is a step of correcting the reference temperature set in step S10 by using the temperature correction value C1 calculated in step S120.

The correction of the reference temperature is performed by adding or subtracting the temperature correction value C1 calculated in step S120 to or from the reference temperature set in step S10.

For the thermal image of the reference object 400, which is obtained in step S10, it is assumed that the temperature value of the highest temperature spot 410 which is the basis for determination of the reference temperature changes due to an ambient environment or a time lapse (for example, from daytime to evening).

In this case, the temperature value of the highest temperature spot 410 which is the basis for determination of the reference temperature needs to be corrected. The reference temperature is corrected by reflecting the temperature correction value C1 obtained in step S120 on the previously set reference temperature.

For example, assuming that the reference temperature that is set on the basis of the highest temperature spot 410 of the thermal image of the reference object 400 in step S10 is 36.5° C. and the temperature correction value C1 calculated in step S120 is 0.9° C., the corrected reference temperature obtained through step S130 becomes 37.3° C. (i.e., 36.5° C.+0.8° C.=37.3° C.). Accordingly, 36.5° C. which is the reference temperature that is initially set on the basis of the highest temperature spot 410 of the thermal image of the reference object 400 in step S10 is changed to 37.3° C. through the error correction of the reference temperature.

After the corrected reference temperature is derived through the process described above, the temperature sensing step S30 for a target object is performed on the basis of the corrected reference temperature.

In this case, after capturing the thermal image of the target object 600 in step S30, the temperature of the thermal image of the target object 600 is calculated by comparing the thermal image of the target object 600 with the highest temperature spot 410 of the thermal image of the reference object 400. In this way, the body temperature of the target object 600 can be detected.

On the other hand, when multiple focus areas 500 and multiple reference temperatures are set, the body temperature of a first moving object whose entire face is present in a first focus area is detected on the basis of a first reference temperature described in step S20, and the body temperature of a second moving object whose entire face is present in a second focus area is detected on the basis of a second reference temperature.

According to the preferred embodiment, the first exemplary error correction method further includes a step of calculating a heating element temperature correction value C1'. In this case, a final temperature correction value C1" is obtained by adding and subtracting the heating element temperature correction value C1' to or from the temperature correction value C1, and the reference temperature is corrected on the basis of the final temperature correction value C1".

The step of the calculating the heating element temperature correction value C1' is configured to calculate a temperature change value of the heating element 10 of the error correction unit 200 according to Equation 2.

$$T1' - T2' = C1' \qquad \text{[Equation 2]}$$

where T1' is a temperature of the heating element 10 of the error correction unit when obtaining a temperature correction reference value, T2' is a temperature of the heating element 10 of the error correction unit when capturing a second thermal image, and C1' is a heating element temperature correction value.

In this case, the reference temperature correction step S130 is configured to correct the reference temperature using the final temperature correction value C1" obtained on the basis of the temperature correction value C1 and the heating element temperature correction value Ct. This final temperature correction value C1" is calculated according to Equation 3.

$$C1 - C1' = C1'' \qquad \text{[Equation 3]}$$

where, C1 is a temperature correction value, C1' is a heating element temperature correction value, and C1" is a final temperature correction value.

After the final temperature correction value C1" is derived through the method described above and the reference temperature is corrected on the basis of the final temperature correction value, the body temperature of the target object can be more accurately measured using the corrected reference temperature.

The method of correcting the reference temperature using the final temperature correction value C1" is performed by adding the final temperature correction value C1" to the reference temperature or subtracting the final temperature correction value C1" from the reference temperature.

A method of measuring the body temperature of the target object using the corrected reference temperature will be described below. That is, after capturing the thermal image of the target object, the body temperature of the target object can be derived by comparing the highest temperature spot 410 of the thermal image of the reference object 400, which is the basis of the corrected reference temperature, and the thermal image of the target object.

(2) Second Method

Figure 13:
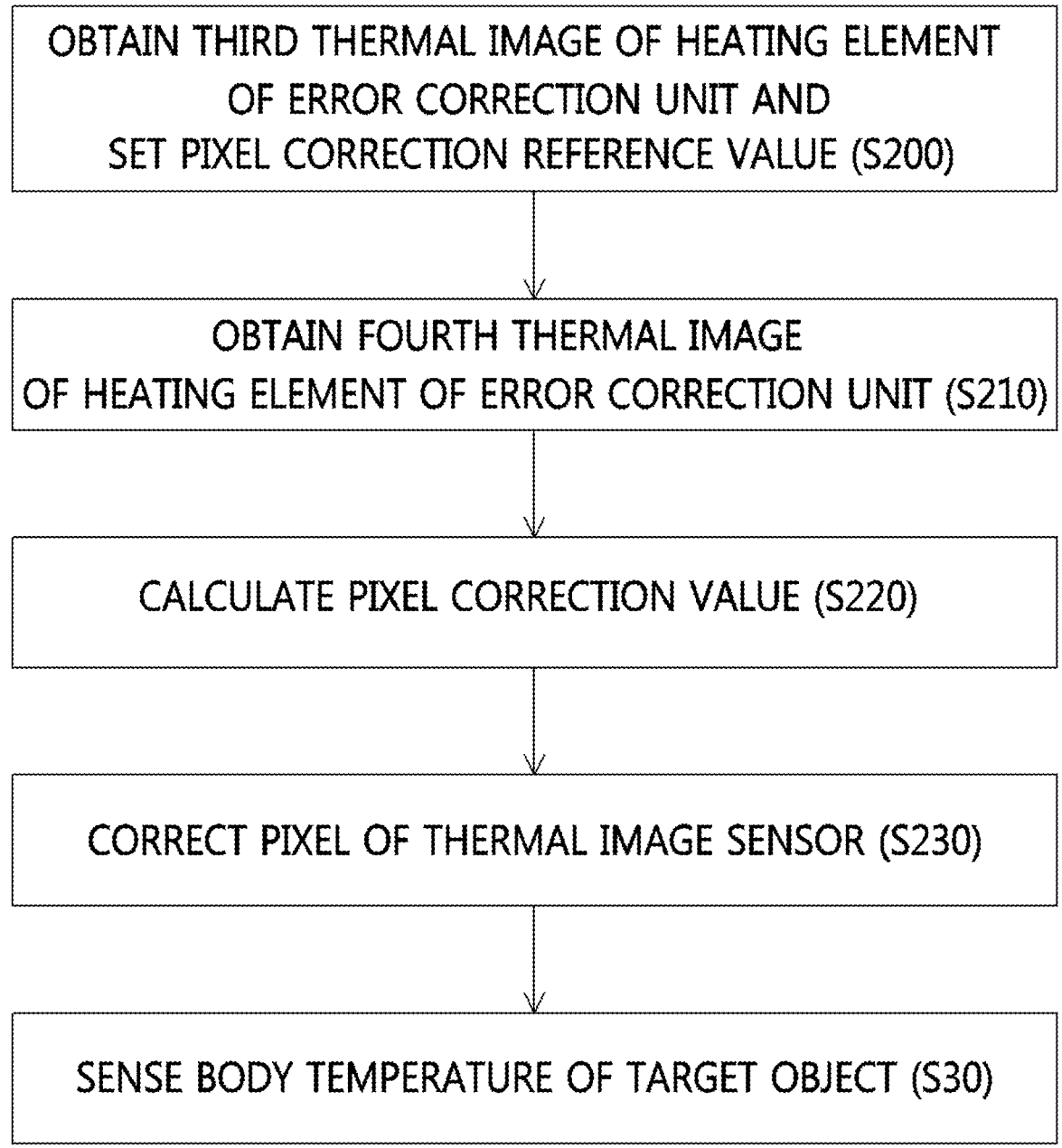
FIG. 13 is a flowchart illustrating a second exemplary error correction method according to one embodiment of the present invention.

FIG. 13 is a flowchart illustrating a second exemplary error correction method according to the present invention. Referring to FIG. 13, the second exemplary error correction method is a method of calibrating a thermal image sensor 120. This error correction method includes step S200 of capturing a third thermal image of the error correction unit 200, step S210 of capturing a fourth thermal image of the error correction unit 200, and step S220 of calculating a pixel correction value, and step S230 of calibrating the thermal image sensor.

Step S200 is a step of capturing a thermal image of the heating element 10 of the error correction unit 200 positioned a predetermined distance from the thermal image sensor and of setting a pixel correction reference value. Hereinafter, the thermal image of the heating element 10 of the error correction unit 200, which is captured in in step S200, will be referred to as a third thermal image.

The error correction unit 200 used in step S200 is a device capable of minimizing a temperature change over time attributable to an ambient environment. The error correction unit 200 has the same configuration as the error correction unit used in step S100.

The third-thermal image capturing step S200 is simultaneously performed with step S10 in which a thermal image of the reference object 400 is captured, or is performed immediately before or after capturing the thermal image of the reference object 400.

After the thermal image of the heating element 10 of the error correction unit 200 is captured as described above, the temperature value of the captured thermal image (i.e., third thermal image) is set as a pixel correction reference value.

The fourth-thermal image capturing step S210 is a step of recapturing a thermal image of the heating element 10 of the error correction unit 200 after a predetermined period of time has elapsed from the completion of step S200 in which the pixel correction reference value is set. Hereinafter, the thermal image of the heating element 10 of the error correction unit 200, which is captured in step S210 following step S200, is referred to as a fourth thermal image.

The fourth-thermal image capturing step S210 is periodically performed at regular time intervals (for example, 20-minute intervals). In this case, the fourth thermal image of the heating element 10 of the error correction unit 200 is captured at regular time intervals, each of the fourth thermal images is compared with the first thermal image captured in step S200, and the pixel value of the thermal image sensor 120 is periodically corrected. In this way, it is possible to constantly accurately measure the body temperature of a moving object without errors attributable to changes in the surrounding environment or time lapse.

According to another embodiment, the fourth-thermal image capturing step S210 is performed when the target object's body temperature detection step S30 is performed. In this case, step S210 is performed such that after the pixel correction reference value setting step S200 is performed, when capturing a thermal image of the target object 600 in step S30, the thermal image (fourth thermal image) of the heating element 10 of the error correction unit 200 is captured at the same time.

The pixel correction value calculation step S220 is a step of calculating a pixel correction value C2 used to correct the pixels of the thermal image sensor 120 using the third thermal image captured in step S200 and the fourth thermal image captured in step S210.

This pixel correction value C2 is calculated according to Equation 4.

$$T3-T4=C2 \quad \text{[Equation 4]}$$

where, T3 is a pixel correction reference value (i.e., a temperature value of the third thermal image of the heating element 10 of the error correction unit, which is captured in step S200), T4 is a temperature value of the fourth thermal image of the heating element 10 of the error correction unit, which is measured in step S210, and C2 is a pixel correction value.

The thermal image sensor calibration step S230 is a step of correcting the pixel values of the thermal image sensor 120 using the pixel correction value C2 calculated in step S220.

The correction of the pixel values of the thermal image sensor 120 is performed by adding or subtracting the pixel correction value C2 obtained in step S220 to or from each of the pixel values of the thermal image sensor 120.

For example, it is assumed that the sensitivity of the thermal image sensor 120 changes due to change in the surrounding environment or the time lapse (from daytime to evening).

In this case, since the reference temperature set in step S10 is a value that is set on the basis of the thermal image of the reference object 400, which is captured by thermal image sensor 120 before the sensitivity of the thermal image sensor 120 changes, it is necessary to recalibrate the thermal image sensor 120 to accurately measure the body temperature of the target object 600 after the sensitivity of the thermal image sensor changes. The calibration of the thermal image sensor 120 is performed on the basis of the pixel correction value C2 obtained in step S220.

Figure 14:
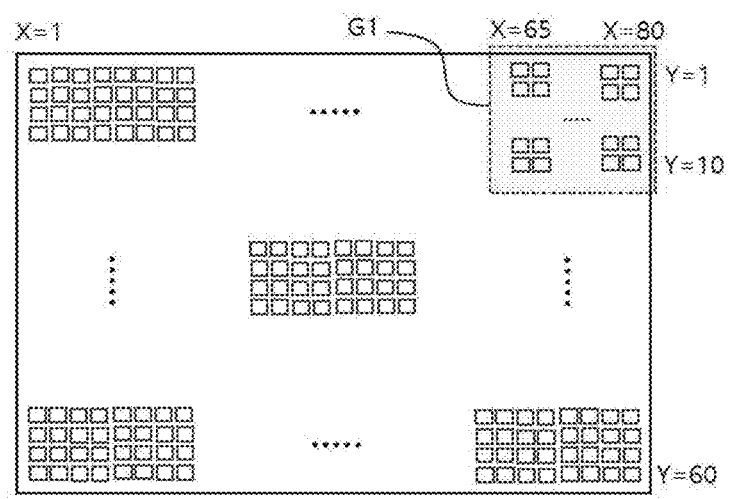
FIG. 14 is a view illustrating pixels in a thermal image sensor according to one embodiment of the present invention.

For example, assuming that the pixel correction value C2 calculated in step S220 is 0.7, the calibration of the thermal image sensor 120 is performed in a manner that the pixel correction value C2 is added to the pixel value of each of the pixels of the thermal image sensor 120 (for example, each of 4800 pixels in the case of FIG. 14).

When the pixel correction of the thermal image sensor 120 is completed through the process described above, the body temperature of the target object is measured with the calibrated thermal image sensor 120 (step S30).

In step S30 in which the body temperature of the target object is detected, a thermal image of the target object 600 is captured with the thermal image sensor 120 calibrated in step S230, the thermal image of the target object 600 is compared with the highest temperature spot 410 (which is the basis of the reference temperature) of the thermal image of the reference object 400 to determine whether the temperature of the target object 600 falls within a normal temperature range.

The error correction unit 200 used in the error correction step is a device whose temperature is measured by all or a part of the pixels of the thermal image sensor 120. The pixels that involve in the temperature measurement are referred to as temperature correction pixels. This will be described in more detail below.

FIG. 14 is a view illustrating pixels in a thermal image sensor according to one embodiment of the present invention. Referring to FIG. 14, the thermal image sensor 120 includes 4800 pixels (i.e., 80 pixels in X axis and 60 pixels in Y axis). In this case, among the 4800 pixels, pixels located at X=65 to 80 and Y=1 to 10 are included in a temperature correction pixel group G1. In this case, at the time of capturing the thermal image of the heating element 10 of the error correction unit 200 with the thermal image sensor 120, at least the half of the heating element 10 needs to be positioned within an area corresponding to the temperature correction pixel group G1.

According to the preferred embodiment, the temperature correction pixel group G1 may be a pixel group located in a corner area of the thermal image sensor 120.

Alternatively, some pixels in the temperature correction pixel group G1 may be used as temperature correction pixels. For example, assuming that the temperature correction pixel group G1 includes pixels located at X=65 to 80 and Y=1 to 10, the temperature correction pixels include at least one pixel of the pixels corresponding to the thermal image of the heating element 10 among the pixels included in the temperature correction pixel group G1. Preferably, a pixel in the center of the temperature correction pixel group G1 is used as a temperature correction pixel. In this case, the pixel located at X=75 and Y=5 is the temperature correction pixel.

The first and third thermal images in step S100 and step S200 are captured by the temperature correction pixels, and the temperature correction reference value and the pixel correction reference value in step S100 and step S200 are determined on the basis of the temperature values of the first and third thermal images. Similarly, the second and fourth thermal images in step S110 and step S210 are also captured by the temperature correction pixels.

According to the preferred embodiment, the second exemplary error correction method further includes a step of calculating a heating element temperature correction value C2'. In this case, a final pixel correction value C1" is obtained by reflecting the heating element temperature correction value C2' on the pixel correction value C2, and the reference temperature is corrected on the basis of the final pixel correction value C1".

The heating element temperature correction value calculation step is configured to calculate a temperature change value of the heating element 10 of the error correction unit 200 according to Equation 5.

$$T3'-T4'=C2'$$ [Equation 5]

where T3' is a temperature of the heating element 10 of the error correction unit when measuring a pixel correction reference value, T4' is a temperature of the heating element 10 of the error correction unit when performing measurement on the fourth thermal image, and C2' is a heating element temperature correction value.

In this case, the thermal image sensor calibration step S230 is configured to calibrate the thermal image sensor 120 by using the final pixel correction value C2" obtained by reflecting the heating element temperature correction value C2' on the pixel correction value C2. This final pixel correction value C2" is calculated according to Equation 6.

$$C2-C2'=C2''$$ [Equation 6]

where, C2 is a pixel correction value, C2' is a heating element temperature correction value, and C2" is a final pixel correction value.

After the final pixel correction value C2" is derived through the method described above and the calibration of the thermal image sensor 120 is completed, the body temperature of the target object can be more accurately measured with the calibrated thermal image sensor 120.

On the other hand, the method of calibrating the thermal image sensor 120 on the basis of the final pixel correction value C2" is performed by adding or subtracting the final pixel correction value C2" to or from the pixel value of each of the pixels of the thermal image sensor 120.

After capturing the thermal image of the target object with the calibrated thermal image sensor 120, the highest temperature spot 410 of the thermal image of the reference object 400, which is the basis of the reference temperature, and the thermal image of the target object are compared with each other to determine whether the body temperature of the target object is within a normal body temperature range.

The temperature detection method according to the present invention described and illustrated above may be written in the form of a program recorded in a recording medium and may be executed by an electronic device. Here, the electronic device refers to a computer such as a laptop computer or a desktop computer. Alternatively, the electronic device may be any device including a central processing unit and a display. Further examples of the electronic device include mobile terminals such as a smartphone. The electronic device is connected to the error correction unit 200 and the thermal imaging camera unit 100.

The recording medium according to the present invention may be an arbitrary recording medium that can be read by the electronic device and may store a program for performing a function of setting the highest temperature spot 410 of the thermal image of the reference object 400 as the reference temperature included within a normal body temperature range, a function of setting one or more focus areas 500 in an image displayed on the display screen 315, a function of capturing a thermal image of a moving object (referred to as a target object) whose entire face is present within the focus area 500 among moving objects included in the image displayed on the display screen 315, and a function (hereinafter, referred to as an A function) of detecting the body temperature of the target object on the basis of the reference temperature that is determined on the basis of the body temperature of the reference object 400.

The program which is recorded in the recording medium according to the present invention and is readable by the electronic device may further include an error correction function.

According to a first embodiment, the error correction function includes a function of capturing a thermal image (hereinafter, referred to as a first thermal image) of the heating element 10 of the error correction unit 200 positioned a distance from the thermal image sensor 120 and of setting a temperature value of the first thermal image as a temperature correction reference value, a function of calculating a temperature correction value C1 according to Equation 1 by recapturing a thermal image (hereinafter, referred to as a second thermal image) of the heating element 10 of the error correction unit 200 at the time of capturing a thermal image of the target object 600 when a predetermined time has elapsed after the temperature correction reference value is set, and a function (hereinafter, referred to as a B function) of changing the reference temperature using the temperature correction value C1.

In addition, the A function is configured to sense the body temperature of the target object 600 on the basis of the reference temperature corrected by the B function.

$$T1-T2=C1$$ [Equation 1]

where, T1 is a temperature correction value, T2 is a temperature value of the second thermal image, and C1 is a temperature correction value.

According to a second embodiment, the error correction function includes a function of capturing a thermal image (hereinafter, referred to as a third thermal image) of the heating element 10 of the error correction unit 200 positioned a distance from the thermal image sensor 120 and of setting a temperature value of the third thermal image as a pixel correction reference value, a function of calculating a pixel correction value C2 according to Equation 4 by recapturing a thermal image (hereinafter, referred to as a fourth thermal image) of the heating element 10 of the error correction unit 200 at the time of capturing a thermal image of the target object 600 when a predetermined time has elapsed after the pixel correction reference value is set, and a function (hereinafter, referred to as a C function) of calibrating the thermal image sensor 120 using the pixel correction value C2.

In this case, each of the third thermal image and the fourth thermal image is captured using a portion of the pixels of the thermal image sensor 120.

In addition, the A function is configured to sense the body temperature of the target object 600 by capturing the thermal image of the target object 600 with the thermal image sensor 120 calibrated through the C function.

$$T3-T4=C2 \qquad [\text{Equation 4}]$$

where T3 is a pixel correction reference value, T4 is a temperature value of the fourth thermal image, and C2 is a pixel correction value.

The recording medium according to the present invention is a medium that is readable by an electronic device and stores a program for implementing a function of changing a current thermal image color (referred to as a first color) of the highest temperature spot 410 into a thermal image color (referred to as a second color) representing to a normal body temperature, and a function of changing the thermal image colors of the remaining spots of the thermal image of the reference target 400 by applying a color conversion value that is used to change the first color into the second color to the remaining spots of the thermal image of the reference target 400.

The recording medium according to the present invention is a recording medium that is readable by an electronic device and stores the program for additionally implementing a function of expressing the thermal image colors of the respective spots of the thermal image of the target object 600 by applying the color conversion value used to change the first color into the second color to the thermal image of the target object 600.

The recording medium according to the present invention is a recording medium that is readable by an electronic device and stores the program for additionally performing a function of setting a warning temperature that is higher than the reference temperature described above, and a function of outputting a notification of an event in which the sensed temperature of the target object 600 is equal to or higher than the warning temperature.

Although preferred embodiments of the present invention have been described and illustrated using specific terms, it is apparent that those terms are used only for clarification of the present invention but not for limiting the scope of the present invention. Accordingly, it is apparent that those embodiments and terms can be modified, changed, altered, and substitutes without departing from the technical spirit and scope of the present invention as defined in the appended claims.

Although the error correction unit 200 of the present invention has been described and illustrated in the form of a discrete device that is mounted on the thermal imaging camera unit 100, it is possible that the error correction unit is provided in the form of a part built in the thermal imaging camera unit.

It should be noted that modifications and equivalents to the embodiments fall within the scope of the present invention as defined in the appended claims.

What is claimed is:

1. An error correction unit for use in an object temperature detection device including a thermal imaging camera unit and a controller, in which the thermal imaging camera unit is equipped with a thermal image sensor, and the controller calculates a temperature of a target object using thermal image information obtained by the thermal image sensor and a temperature change value of a heating element, the error correction unit comprising:
   a first arm member connected to the thermal imaging camera unit and configured to be rotatable;
   a heating element holder connected to the first arm member and configured to be rotatable;
   the heating element fixed to the heating element holder; and
   a temperature sensor configured to measure a temperature of the heating element,
   wherein the heating element is configured to be positionable within an angle θ1 of view of the thermal imaging camera unit through rotation operations of the first arm member and the heating element holder such that the thermal imaging camera unit obtains a thermal image of the heating element and the controller uses data of the thermal image of the heating element,
   the temperature sensor is configured to measure a temperature of the heating element at a first time and a temperature of the heating element at a second time different from the first time so that the controller uses a temperature change value of the heating element, and
   data of the temperature measured at the first time and data of the temperature measured at the second time are transmitted to the controller.

2. The error correction unit according to claim 1, further comprising a support mounted on the thermal imaging camera unit,
   wherein the first arm member is connected to the thermal imaging camera unit via the support, and
   the first arm member is rotatably connected to the support.

3. The error correction unit according to claim 1, wherein the first time is a time at which a first thermal image of the heating element is obtained before a thermal image of the target object is obtained, and
   the second time is a time at which a second thermal image of the heating element is obtained after a predetermined time has elapsed from the first time.

4. The error correction unit according to claim 1, wherein the heating element is configured to be arranged perpendicularly to a thermal imaging central axis D1 of the thermal imaging camera unit through adjustment of rotational motion of the first arm member and the heating element holder,
   wherein when perpendicularly arranged, a virtual line extending from a surface of the heating element is orthogonal to the thermal imaging central axis D1.

5. The error correction unit according to claim 4, wherein when the thermal image sensor obtains a thermal image of the heating element, the heating element is arranged in perpendicular to the thermal imaging central axis D1.

6. The error correction unit according to claim 1, wherein the heating element is configured to be disposed in an upper region within an angle of view, and
   the upper region within the angle of view is an area above the thermal imaging central axis D1 of the thermal imaging camera unit.

7. The error correction unit according to claim 1, further comprising a second arm member disposed between the first arm member and the heating element holder,
   wherein the second arm member is rotatably coupled to the first arm member via a first joint, and the heating element holder is rotatably coupled to the second arm member via a second joint.

8. The error correction unit according to claim 1, wherein the heating element comprises a PTC device or an LED device.

9. The error correction unit according to claim 2, wherein the first arm member is rotatably coupled to the support via a hinge joint or a ball joint.

10. The error correction unit according to claim 7, wherein the first joint or the second joint is a hinge joint or a ball joint.

11. The error correction unit according to claim 1, further comprising a heating controller that controls a voltage applied to the heating element so that the heating element constantly maintains a temperature by generating heat.

12. An object temperature detection device comprising:
a thermal imaging camera unit equipped with a thermal image sensor;
the error correction unit according to claim 1; and
the controller configured to calculate a temperature of a temperature measurement target object on the basis of data of a thermal image of the temperature measurement target object, which is obtained by the thermal image sensor, data of a thermal image of a heating element of the error correction unit, which is obtained by the thermal image sensor, and a temperature change value of the heating element of the error correction unit.

* * * * *